July 26, 1966 H. E. HUDDLE ETAL 3,262,460
CONVEYOR TYPE CLEANING DEVICE FOR FRAGILE
CONTAINERS AND THE LIKE
Filed Feb. 17, 1964 3 Sheets-Sheet 1
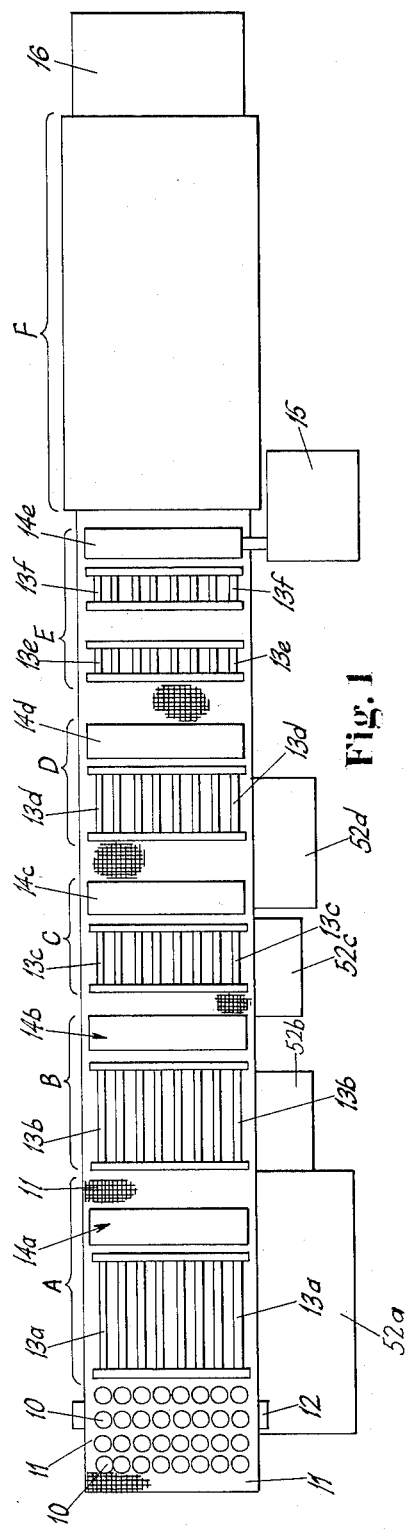
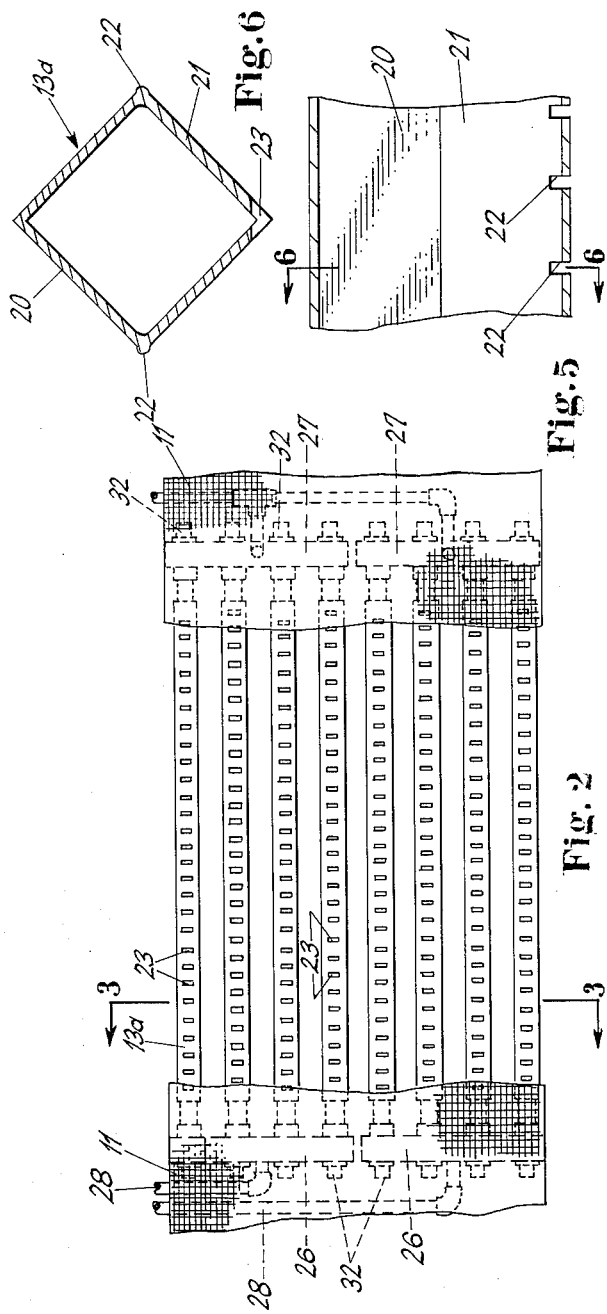
INVENTORS
HARLEY E. HUDDLE AND
VERNON BALDWIN,
BY
ATTORNEYS July 26, 1966 H. E. HUDDLE ETAL 3,262,460
CONVEYOR TYPE CLEANING DEVICE FOR FRAGILE
CONTAINERS AND THE LIKE
Filed Feb. 17, 1964 3 Sheets-Sheet 3

INVENTORS
HARLEY E. HUDDLE AND
VERNON BALDWIN,
BY
ATTORNEYS.

United States Patent Office 3,262,460
Patented July 26, 1966

3,262,460
CONVEYOR TYPE CLEANING DEVICE FOR
FRAGILE CONTAINERS AND THE LIKE
Harley E. Huddle and Vernon Baldwin, Cincinnati, Ohio, assignors to Cincinnati Cleaning and Finishing Machine Company, Cincinnati, Ohio, a corporation of Ohio
Filed Feb. 17, 1964, Ser. No. 345,467
14 Claims. (Cl. 134—72)

This invention relates to a conveyor type cleaning device for cleaning containers and similar articles, and has to do more particularly with a machine adapted to thoroughly clean extremely light weight and relatively fragile containers without resort to mechanical hold downs or other container engaging means which might act to damage the containers during the cleaning operation.

The detailed description of this invention will be in terms of an exemplary embodiment designed and adapted to clean drawn aluminum beer cans; but it is to be understood, and hence should be emphasized at the outset, that the invention is not limited to this particular usage but rather may be employed for diverse cleaning and related container treating operations wherein similar problems are encountered.

By way of background, beer cans and like containers were formerly made from tinned steel, usually by a procedure wherein the coated and cleaned sheet stock was rolled into a tube and then capped. Such containers are relatively rigid and hence can be readily handled employing conventional conveying and guiding mechanism which makes positive physical contact with the containers. Thus, if the containers were to be cleaned by conveying them through a spray chamber in inverted position, suitable hold down means would be provided for maintaining the containers in alignment on the conveyor against the force of the spray means. It has now been found that such containers may be economically formed from aluminum by an impact drawing operation. An aluminum container so formed presents many competitive advantages over the conventional steel can, and hence has become a highly desirable substitute. However, such aluminum cans have presented a number of problems from the cleaning standpoint. The drawing operation itself leaves a dirty residue in the formed containers which, in itself, necessitates an exceptionally thorough cleansing in order to assure complete removal of such residue. In addition, aluminum containers of the type under consideration are extremely light in weight. For example, a drawn aluminum beer can—which comprises a cylindrical body closed at one end—will weigh on the average slightly less than ¾ of an ounce, and in the empty, open ended condition, is highly fragile in that it may be readily dented or otherwise marred. Such aluminum containers, due to their light weight, are even more susceptible to being blown about and displaced by the spray means in a conventional cleaning device; and if the usual mechanical gripping fingers or hold down means are employed to maintain the cans in position, such means act to dent and otherwise damage the relatively fragile edges and surfaces of the containers.

Accordingly, it is a principal object of the instant invention to provide an industrial container cleaning device for aluminum containers and the like which avoid the problems noted above and at the same time will thoroughly and effectively clean the containers being acted upon.

More specifically, it is an object of this invention to provide a device of the character described which does not include mechanical hold down devices of any kind, and which will therefore be capable of handling more fragile objects without damage than has heretofore been possible.

Still a further object of this invention is the provision of a cleaning device employing a novel spray nozzle design and arrangement, the design of the nozzles and their arrangement coacting in such a manner as to accomplish the various washing and rinsing operations without knocking over the unsupported, light weight containers.

A further object of this invention is to provide a cleaning device of the character described including a novel drain and blow off unit, such unit being designed to remove the bulk of the water or other fluid from the objects being cleaned prior to their entering the drying station, and to accomplish such draining and blow off operation without knocking over the light weight, fragile containers.

Still another object of this invention is to provide a system of spray nozzles and valves so arranged that the nozzles themselves may be readily cleaned and cleared of obstructions in the event they become clogged. Ancillary to this objective, the design of the system also serves to balance the cleaning fluid pressure throughout the system, thereby stabilizing the force of the various sprays and hence reducing any tendency to upset the articles being cleaned.

Another object of the spray invention is to provision of a spray tube arrangement permitting easy and thorough brush cleaning of nozzles, even while the nozzles remain in operation.

Still a further object of the invention is the provision of a high-speed mechanism of the character described which is capable of rapidly and continuously handling large quantities of objects being cleaned.

The foregoing objects, together with other which appear hereinafter or which will become apparent to the skilled worker in the art upon reading this specification, are accomplished by that construction and arrangement of parts of which an exemplary embodiment is shown in the accompanying drawings, wherein:

FIGURE 1 is a schematic diagram indicating the various stations and relationship of the components comprising the cleaning device of this invention;

FIGURE 2 is a fragmentary plan view showing a plurality of nozzles constructed in accordance with this invention;

FIGURE 5 is an enlarged fragmentary sectional view showing a longitudinal section of the spray nozzles of this invention;

FIGURE 6 is a cross-sectional view taken along the line 6—6 of FIGURE 5;

Figure 3:
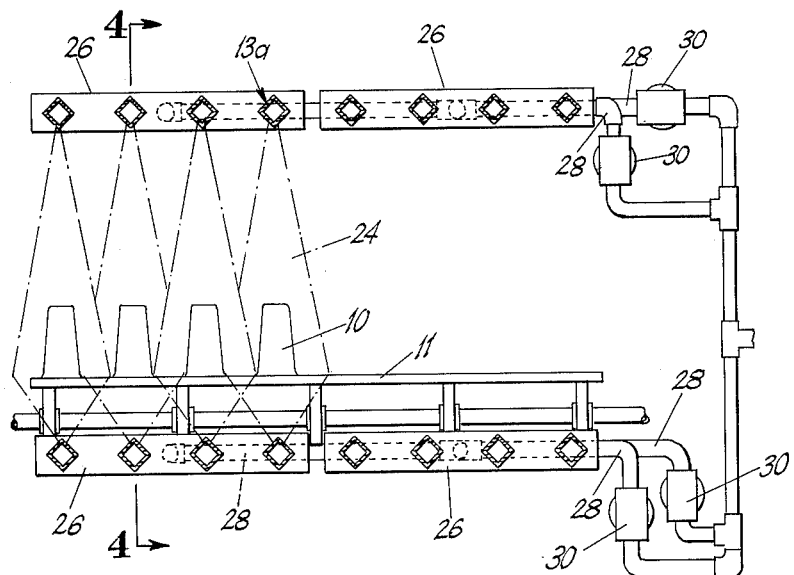
FIGURE 3 is a vertical cross-sectional view taken along the lines 3—3 of FIGURE 2.

Briefly considered, this invention contemplates a tunnel-like machine housing enclosing a plurality of individual processing stations at which the various cleaning operations take place. The containers to be cleaned are advanced through the various stations by means of a continuously moving, perforate conveyor, upon which the containers are placed in inverted position. As the containers are advanced by the conveyor, they are acted upon by a series of sprays which clean and rinse the containers, and also by blow-off means which remove residual liquid. At its trailing end the machine incorporated drying means for drying the cleaned and rinsed container. In actual practice a six-station machine has been designed which will process 240 aluminum cans per minute at a mean conveyor speed of 3¾ feet per minute, and accomplish an excellent cleaning job.

Referring now to FIGURE 1, the six-station machine briefly described above has been shown schematically, the various stations being indicated by the capital letters "A" through "F." As will be explained in more detail hereinafter, station A is the main washing station, station B is a rinsing station, station C is an acid wash station, station D is a second rinse station, station E is a third rinse station, and station F is the drying station.

Immediately prior to the washing zone or station A is a short loading or approach station at which a plurality of cans 10 are placed on the perforate conveyor 11. Prior to entering the washing station A it may be desirable to subject the inside surfaces of the cans to live steam, and this may be accomplished by a low pressure steam source 12 underlying the conveyor 11.

The washing station A includes a plurality of elongated tubular members 13a lying in spaced apart relation and extending generally parallel to the direction of motion of the conveyor 11. A first set of such tubular members overlies the path of travel of the cans, while a second set underlies their path of travel, being positioned beneath the perforate conveyor 11. As explained in more detail hereinafter, spray nozzles are formed in the elongated tubular members 13a throughout the lengths thereof, and designed to provide a series of very thin, fan-shaped sprays which are oriented transversely of the conveyor 11. Within the washing zone, but following the washing nozzles, is a drain and blow-off head indicated generally at 14a. This blow-off head is designed to blow off the greater portion of the washing water or other fluid prior to the passage of the cans to the rinsing station B.

The rinsing station B is structurally similar to the washing station A, in that it also includes a plurality of tubular members 13b aligned generally parallel to the direction of motion of the conveyor 11. The spray nozzles in the tubular members 13b are formed, as will be described in more detail hereinafter, in a manner identical with the nozzles in the tubular members 13a, excepting that they produce a somewhat narrower fan-shaped spray. The blow-off head 14b is essentially identical with the blow-off head 14a of the washing station. While the tubular members 13a of washing station A are supplied with a hot washing solution, the tubular members 13b of rinsing station B will preferably be supplied with a clear, cold rinse water.

At station C, which is again similar in construction to stations A, and B, the containers being washed are sprayed with a suitable acid mixture. This acid tranment will be employed when it is desired to paint or otherwise finish the exterior surfaces of the cans. As before, the station incorporates a plurality of tubular members 13c and a blow-off head 14c.

Station D is a second rinsing station, which will remove the excess acid from the cans being cleaned. It too is similar in construction to the preceding stations and embodies a series of tubular members 13d and a blow-off head 14d.

A final rinse prior to drying is accomplished in station E. As will be seen in FIGURE 1, this stage actually includes two distinct sets of tubular rinsing members designated 13e and 13f. Each of the sets of tubular members 13e and 13f will be connected to a separate supply of rinsing water or other fluid. Preferably, the members 13e will be connected to a supply of fresh water, while the members 13f will be connected to the outlet of a de-ionizer, indicated generally at 15, thereby providing a final de-ionized rinse. Such rinse frees the cans from salt spots, and the cleaned cans are then ready to enter the drying station F. The final rinse station E also terminates in the blow-off head 14e, which is identical in construction with the blow-off heads in the earlier stations, and will be described in detail hereinafter.

The final station of the washing machine of this invention is the drying chamber F. The drying chamber is entirely conventional, and in and of itself, forms no part of the instant invention; it will not therefore be described in more detail. It will be couse, be understood that the length of the chamber and the operating temperature will be regulated in accordance with well known practices so that the cans will emerge from the chamber completely dry, whereupon they are received at an unloading station 16.

From the foregoing discussion, it will be apparent that the spray nozzles in the various stations must be designed so as to supply a relatively large volume of the washing or rinsing liquid respectively, and to supply this liquid in such a manner that the light weight, readily tiltable cans are not toppled over. Inasmuch as the design and arrangement of the nozzle in each of the various stations is identical, FIGURES 2 through 6 will illustrate an exemplary arrangement.

As indicated above, the individual spray nozzles are formed in the elongated tubular members 13a through 13f. As seen in FIGURES 5 and 6, each of the tubular members may be conveniently formed by joining together the legs of two right angle metallic strips 20 and 21 in edge abuting relation, as by welding indicated at 22. The nozzles themselves are formed by milling or otherwise cutting a series of narrow transverse slots 23 through one edge of the tubular members. Nozzles formed in this manner produce a very thin, fan shaped spray oriented transversely of the conveyor 11. The fan shaped character of the sprays has been indicated at 24 in FIGURE 3, while the thin nature of the spray is indicated at 25 in FIGURE 4.

Figure 4:
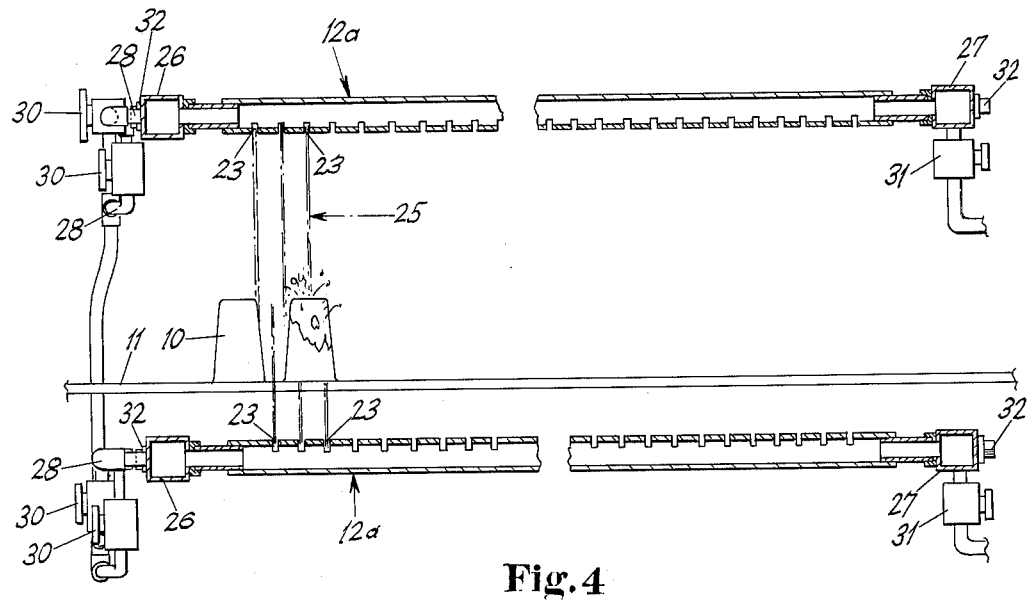
FIGURE 4 is a vertical cross-sectional view taken along the lines 4—4 of FIGURE 3.

As will be seen by comparing FIGURES 2, 3, and 4, the embodiment illustrated includes eight of the tubular members 13a disposed above the conveyor 11 and the containers supported thereon, with another series of eight tubular members disposed below the conveyor. All of the tubular members are aligned generally parallel to the direction of movement of the conveyor 11, and each of the members 13a above the conveyor is substantially in vertical alignment with the corresponding tubular member underlying the conveyor. However, as will be apparent from FIGURES 2 and 3, the nozzles 23 adjacent pairs of the tubular members are arranged in staggered relationship, that is, the nozzles in adjacent rows are longitudinally staggered relative to each other so that the fan shaped sprays 24 are in interdigitating relationship; and it will be noted from FIGURE 3 that the width of the fan shape sprays is such that, while interdigitated, they nonetheless overlap each other. Similarly, and as seen in FIGURE 4, the nozzles in corresponding upper and lower tubular members are staggered with respect to each other so that as between top and bottom the sprays are also in interdigitating relationship. It has been found that this interdigitating relationship of the sprays—acting both from above and below—together with their transverse disposition relative to the path of the containers, applies counterbalancing forces to the containers acting to stabilize them on the conveyor. Thus, the sprays act as an hydrostatic hold down effective to maintain them in position to the elimination of mechanical hold downs, guide fingers and the like. At the same time, the multiplicity of sprays act to thoroughly perform the intended cleaning operations.

As will be apparent to the skilled worker in the art, the very small spray nozzle openings 23 must be kept clean and completely open at all times. Therefore, it is a very important consideration in the design of the spray devices to provide adequate means for keeping both the tubular members 13a and the nozzles 23 clean. In the embodiment shown, the eight tubular members above the conveyor, as well as the eight tubular members below the conveyor, are each arranged in two banks of four tubular members, each such bank of four tubular members exextending between an opposing pair of headers 26 and 27, as seen in FIGURES 2 and 4. The headers 26 are each supplied with the appropriate liquid, i.e., washing solution, rinsing water, acid rinse, etc., by means of the inlet conduits 28. It will also be seen that the headers 27 at the opposite ends of the spray tubes 13a are provided with fluid outlets 29. Each of the inlet conduits 28 is provided with a valve 30; and the outlet conduits with valves 31. It is believed that the operation of the spray units will now be apparent. By closing the outlet valves 31, all of the fluid entering the headers 26 will be forced out the nozzles 23, thereby providing the sprays required for the various washing and rinsing operations. When it is desired to clean out any given bank of four tubular members, the outlet valve from the header 27 for such bank may be opened. This will permit the fluid to flow completely through the tubular members 13a, the header 27, and out the outlet conduit 29, thereby flushing out any accumulation of lint, dirt and the like from the tubular members.

It has also been found that the flush-out system just described, including the headers at the opposite ends of the banks of tubular members 13a, serves to balance the pressure at each of the nozzles 23, thereby producing more uniform sprays having less tendency to upset the containers being cleaned.

In some cases, an even more thorough cleaning of the tubular members 13a may be necessary, and hence it is desirable to provide the threaded plugs 32 in one or both of the headers 26 and 27 in alignment with each of the tubular members 13a. In the embodiment illustrated, such threaded plugs have been shown in the headers at both ends of the tubular members, and in fact, this arrangement has proven to be highly satisfactory.

Figure 7:
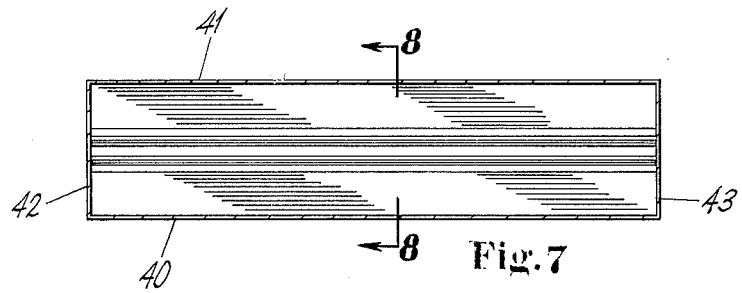
FIGURE 7 is a bottom plan view on a greatly enlarged scale showing one of the blow-off nozzles of the invention.
Figure 8:
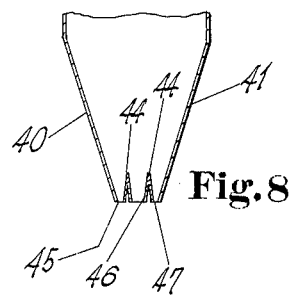
FIGURE 8 is a cross-sectional view taken along the line 8—8 of FIGURE 7.

It will be recalled from the description of the machine as a whole that each of the various cleaning and rinsing operations is followed by a drain and blow-off operation. The novel drain and blow-off head adapted to carry out this operation without upsetting the containers has been shown in detail in FIGURES 7, 8 and 9. The blow-off head is basically rectangular and extends the entire transverse width of the conveyor 10. It includes at its lower end a pair of sloping side walls 40 and 41 and the end walls 42 and 43. A pair of identical inverted V-shaped members 44 are secured to and extend between the end walls 42 and 43 and form in the bottom of the blow-off head a leading outlet 45, a central outlet 46, and a trailing outlet 47. The blow-off head is so designed that the leading and trailing outlets 45 and 47 are of approximately the same size, and are substantially smaller in width than the central opening 46. In addition, the distance from the front edge of the leading outlet to the rear edge of the trailing outlet is approximately equal to the diameter of the aluminum cans being cleaned. By virtue of this construction, it is possible to remove the bulk of the moisture from the object being cleaned prior to its entering the next succeeding station. Thus, as an aluminum can moves beneath the blow-off head in the manner illustrated in FIGURE 9, moving from left to right, the leading edge of the can is first contacted by a stream of air emerging from the outlet 45. Since this outlet is relatively narrow, the stream of air will impinge upon a limited area of the can and will be of insufficient magnitude to upset the can. However, as the can continues to move toward the right, it is contacted by a much wider stream of air emerging from the central outlet 46. At this time, however, the air emerging from the outlet 45 is directed toward the center part of the can, and hence will provide a counterbalancing force effective to prevent the can from being toppled over. Similarly, as the can passes further to the right, the relatively narrow stream of air from trailing outlet 47 will contact the can and again assist in preventing it from being tipped over as the trailing edge of the can passes beneath the central outlet 46.

As in the case of the sprays, the streams of air extend transversely of the conveyor and, being directed vertically downwardly, the forces tending to upset the containers are effectively minimized and the containers will remain in place on the conveyor. At the same time the streams of air effectively remove the bulk of the cleaning solution or other fluids from the containers.

Figure 9:
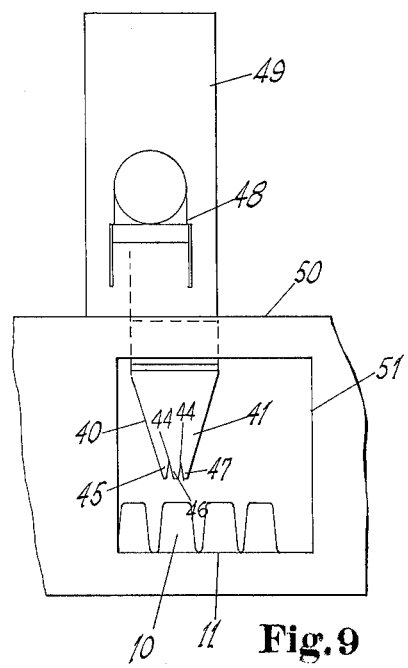
FIGURE 9 is an elevational view of one of the blow-off nozzles in its position of use.

Referring to FIGURE 9, air under pressure is supplied to the blow-off heads by means of a suitable motor driven fan, indicated at 48 which may be located in a stack 49 extending upwardly from the hood 50 which surrounds the conveyor and houses the various stations. Such hood may be provided throughout its length with access doors 51 arranged to provide ready access to the various operating components of the machine.

From the foregoing description, it should be apparent that the instant invention provides effective means for thoroughly cleaning and otherwise treating aluminum cans and similar light weight containers. In the interest of eliminating nonessential details from the disclosure, numerous standard and well known components of the machine have been eliminated. It will be understood, for example, that the machine will include tanks, such as the tanks 52a, 52b, 52c and 52d underlying the various washing and rinsing stations. Preferably, such tanks will be connected to suitable pump means so that the washing solution, rinse water, and the like may be reused. If the washing solution or other treating material is to be applied in a heated condition, suitable heating means will also be provided. If, on the other hand, the material being sprayed on the cans is not suitable for reuse—as in the case of the deionizing rinse, suitable drain means will be provided. Similarly, a source of steam will be provided for the steam source 12; and of course a prime mover and drive means will be provided to drive the conveyor 11.

Having, however, described the invention in an exemplary embodiment and with the understanding that modifications may be made therein without departing from its spirit and purpose, what it is desired to secure and protect by Letters Patent is:

1. In combination in a cleaning machine for lightweight metallic containers and the like wherein the containers are advanced through a plurality of stations on a continuously moving perforate conveyor with the containers supported on said conveyor in inverted position, a washing station, a first drain and blow-off station immediately following said washing station, a rinse station immediately following said first drain and blow-off station, a second drain and blow-off station immediately following said rinse station, and a drying station beyond said second drain and blow-off station; said washing station and said rinse station each including a multiplicity of nozzles arranged both above and below said conveyor and positioned to direct streams of liquid downwardly onto the outer surfaces of the inverted containers and upwardly from beneath the perforate conveyor onto the interior surfaces of said inverted containers, means connecting the nozzles of said washing station to a supply of washing fluid, and means connecting the nozzles of said rinsing station to a supply of rinsing solution; each of said drain and blow-off stations comprising a blow-off head overlying said conveyor and extending transversely substantially the full width of said conveyor, and means for supplying air under pressure to said blow-off head, said blow-off head having outlet means oriented to direct the air under pressure downwardly onto the outer surfaces of the containers to remove the washing and rinsing solutions therefrom; said drying station including means for subjecting the rinsed containers to heated air to completely dry said containers prior to their removal from the conveyor.

2. The cleaning machine claimed in claim 1 including additional washing and rinsing stations intermediate said second drain and blow-off station and said drying station, each of said additional washing and rinse stations being immediately followed by an additional drain and blow-off station.

3. The cleaning machine claimed in claim 1 wherein the nozzles in the washing and rinse stations are arranged in a plurality of rows extending parallel to the direction of motion of the conveyor, wherein an equal number of rows of said nozzles are disposed above and below said conveyor, each row of nozzles above said conveyor being in substantially vertical alignment with one of the rows of nozzles below said conveyor, wherein said nozzles are configured to produce thin fan-shaped sprays oriented transversely of the direction of movement of the containers being cleaned, and wherein the nozzles in the vertically aligned rows are staggered with respect to each other, whereby the fan-shaped sprays are in interdigitating relationship.

4. The cleaning machine claimed in claim 3 wherein adjoining rows of nozzles both above and below the conveyor are staggered relative to each other so that their fan-shaped sprays will also be in interdigitating relation.

5. The cleaning machine claimed in claim 4 wherein said rows of nozzles each comprise an elongated tubular member having a plurality of narrow transverse slots therein, said tubular members being arranged parallel to the direction of motion of the conveyor, wherein a plurality of said elongated members are connected at one end to a first header and at their opposite end to a second header, wherein an inlet conduit is operatively connected to said first header and an outlet conduit to said second header, and wherein said outlet conduit at least includes a control valve for opening and closing said outlet conduit to the flow of fluid therethrough.

6. The cleaning machine claimed in claim 5 wherein at least one of said headers has openings therein in axial alignment with each of said tubular members, and a removable closure for each of said openings.

7. The cleaning machine claimed in claim 1 wherein the outlet means in each of said blow-off heads comprises a leading outlet, a central outlet, and a trailing outlet, said outlets being parallel to each and extending substantially the full length of said blow-off head, said leading and trailing outlets being of substantially the same width, said central outlet being of a greater width than said leading and trailing outlets, whereby a greater volume of air is discharged from said central outlet than from said leading and trailing outlets.

8. The cleaning machine claimed in claim 7 wherein the distance from the front edge of said leading outlet to the rear edge of said trailing outlet is substantially equal to the bottom diameter of the containers being cleaned.

9. For use in a conveyor type cleaning machine adapted to clean light-weight unstable containers in the absence of mechanical hold-down means for maintaining the containers in contact with the conveyor, a spray nozzle construction comprising a multiplicity of nozzles arranged in a plurality of rows extending parallel to the direction of movement of the conveyor, an equal number of rows of said nozzles being disposed above and below the conveyor, each row of nozzles above the conveyor being in substantially vertical alignment with one of the rows of nozzles below the conveyor, the nozzles in said vertically aligned rows being staggered relative to each other, said nozzles each being configured to produce a thin fan-shaped spray oriented transversely of the direction of movement of the containers being cleaned, whereby said fan-shaped sprays will contact the containers in interdigitating relationship.

10. The spray nozzle construction claimed in claim 9 wherein the nozzles in adjoining rows both above and below the conveyor are staggered with respect to each other, whereby their fan-shaped sprays are also in interdigitating relation with respect to the sprays from nozzles in the adjacent rows.

11. The spray nozzle construction claimed in claim 10 wherein said rows of nozzles each comprise an elongated tubular member having a plurality of spaced apart narrow transverse slots formed therein defining said nozzles, said tubular member being rectangular in cross-section with said transverse slots formed across an edge of said tubular member.

12. The spray nozzle construction claimed in claim 11 wherein a plurality of said elongated tubular members are connected at one end to a first header and at their opposite ends to a second header, an inlet conduit operatively connected to said first header and an outlet conduit operatively connected to said second header, a control valve in at least said outlet conduit for opening and closing said outlet conduit to the flow of fluid therethrough, openings in at least one of said headers in axial alignment with each of said tubular members, and a removable closure for each of said openings.

13. For use in a conveyor type cleaning machine adapted to clean light-weight unstable containers in the absence of mechanical hold-down means for the containers, an improved blow-off head comprising an elongated hollow head adapted to extend transversely of the conveyor on which the containers are advanced, said hollow head terminating at its lowermost end in a leading outlet, a central outlet, and a trailing outlet, said outlets extending in parallel relation lengthwise of said elongated blow-off head, said central outlet being of a greater width than the leading and trailing outlets, and means connecting said blow-off head to a supply of air under pressure, whereby a greater volume of air is forced out said central outlet.

14. The blow-off head claimed in claim 13 wherein said leading and trailing outlets are of substantially the same width, and wherein the distance from the front edge of said leading outlet to the rear edge of said trailing outlet is substantially equal to the diameter of the containers at the ends thereof in closest proximity to said blow-off head.

References Cited by the Examiner
UNITED STATES PATENTS

| | | | |
|---|---|---|---|
| 1,033,195 | 7/1912 | Robinson | 239—592 |
| 1,215,596 | 2/1917 | Wescott | 134—73 |
| 1,561,503 | 11/1925 | Barry et al. | 134—199 X |
| 1,597,686 | 8/1926 | Merseles | 239—590 |
| 1,654,355 | 12/1927 | Webb | 134—199 |
| 2,250,238 | 7/1941 | Smith | 134—72 |
| 2,314,078 | 3/1943 | Crawford | 239—590 |
| 2,347,149 | 4/1944 | Chirgwin | 239—589 |
| 2,610,642 | 9/1952 | D'Aurora | 134—62 X |
| 2,633,437 | 3/1953 | Detjen | 134—72 X |
| 2,655,162 | 10/1953 | Zademach et al. | 134—129 X |
| 2,710,819 | 6/1955 | Weber et al. | 134—131 X |
| 2,852,311 | 9/1958 | Alexeff | 239—590 |
| 3,081,784 | 3/1963 | Hanna | 134—199 |

CHARLES A. WILLMUTH, *Primary Examiner.*

GEORGE J. NORTH, *Examiner.*

ROBERT L. BLEUTGE, *Assistant Examiner.*